United States Patent
Dreyer et al.

(10) Patent No.: US 6,724,725 B1
(45) Date of Patent: Apr. 20, 2004

(54) AUTOMATIC LAN FLOW CONTROL MECHANISMS

(75) Inventors: Stephen F. Dreyer, Los Altos, CA (US); Eric T. West, San Jose, CA (US); Donald W. Alderrou, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/546,953

(22) Filed: Apr. 11, 2000

Related U.S. Application Data (62) Division of application No. 08/909,459, filed on Aug. 11, 1997, now Pat. No. 6,098,103.

(51) Int. Cl.$^7$ .................................................. H04J 1/16
(52) U.S. Cl. ...................................... 370/231; 370/236
(58) Field of Search ................................ 370/229, 230, 370/231, 235, 236; 709/234, 236, 250

(56) References Cited

U.S. PATENT DOCUMENTS

| | | | | |
|---|---|---|---|---|
| 6,026,075 A | * | 2/2000 | Linville et al. | 370/236 |
| 6,222,825 B1 | * | 4/2001 | Mangin et al. | 370/235 |
| 6,295,281 B1 | * | 9/2001 | Itkowsky et al. | 370/293 |

* cited by examiner

Primary Examiner—Chau Nguyen
Assistant Examiner—Christine Ng
(74) Attorney, Agent, or Firm—Thelen Reid & Priest, LLP (57) ABSTRACT

A method operates a media access control device. The method includes (a) detecting the assertion of a flow control condition, (b) generating a PAUSE frame in response to the detection of a flow control condition, the PAUSE frame directing a remote device to PAUSE for a first amount of time, (c) causing the media access device to wait for a second amount of time, the second amount of time being less than or equal to the first amount of time, and (d) generating, upon expiration of the second amount of time and the continued assertion of the flow control condition, an additional PAUSE frame directing a remote device to PAUSE for a first amount of time.

2 Claims, 5 Drawing Sheets

AUTOMATIC LAN FLOW CONTROL MECHANISMS

CROSS REFERENCE TO RELATED APPLICATION

This application is a divisional of U.S. patent application Ser. No. 08/909,459 filed Aug. 11, 1997, entitled "Automatic MAC Control Frame Generating Apparatus for LAN Flow Control," now U.S. Pat. No. 6,098,103.

BACKGROUND OF THE INVENTION

1. Field of the Invention

The present invention relates to integrated circuit technology and to integrated circuits used in data communications technology. More particularly, the present invention relates to data communications technology utilizing packet-type networked signaling systems. Still more particularly, the present invention will find particular applicability in full-duplex Ethernet Local Area Network (LAN) systems conforming to IEEE standard 802.3x.

2. The Background Art

Ethernet is a CSMA/CD protocol. CSMA/CD (Carrier Sense, Multiple Access, Collision Detect) means that: (1) all stations on the network share the network and have equal access to the same network media ("Multiple Access"); (2) since the network is shared, only one station can transmit on the network at a time and as a consequence, every station has to listen to the network and make sure that no other station is transmitting before that station can transmit ("Carrier Sense"); and (3) in the event that two stations on the network do transmit simultaneously (a condition termed a "collision"), each station on the network must sense the collision and retransmit data later when the network is quiet ("Collision Detect").

The Institute of Electrical and Electronic Engineers (IEEE) has introduced a series of standards referred to as the 802.3 protocol for implementing Ethernet networks. All Ethernet networks are supposed to conform to this set of standards in order to maintain a base level of interoperability. A portion of this specification is presently entitled "IEEE P802.3x/D3.2 Supplement to Carrier Sense Multiple Access with Collision Detection (CSMA/CD) Access Method & Physical Layer Specifications: Specification for 802.3 Full Duplex Operation" and another portion is presently entitled "IEEE Draft P802.3z/D3.1 Supplement to Carrier Sense Multiple Access with Collision Detection (CSMA/CD) Access Method & Physical Layer Specifications: Media Access Control (MAC) Parameters, Physical Layer, Repeater and Management Parameters for 1000 Mb/s Operation" dated Jul. 18, 1997. These are both hereby incorporated by reference as if set forth fully herein.

Figure 1:
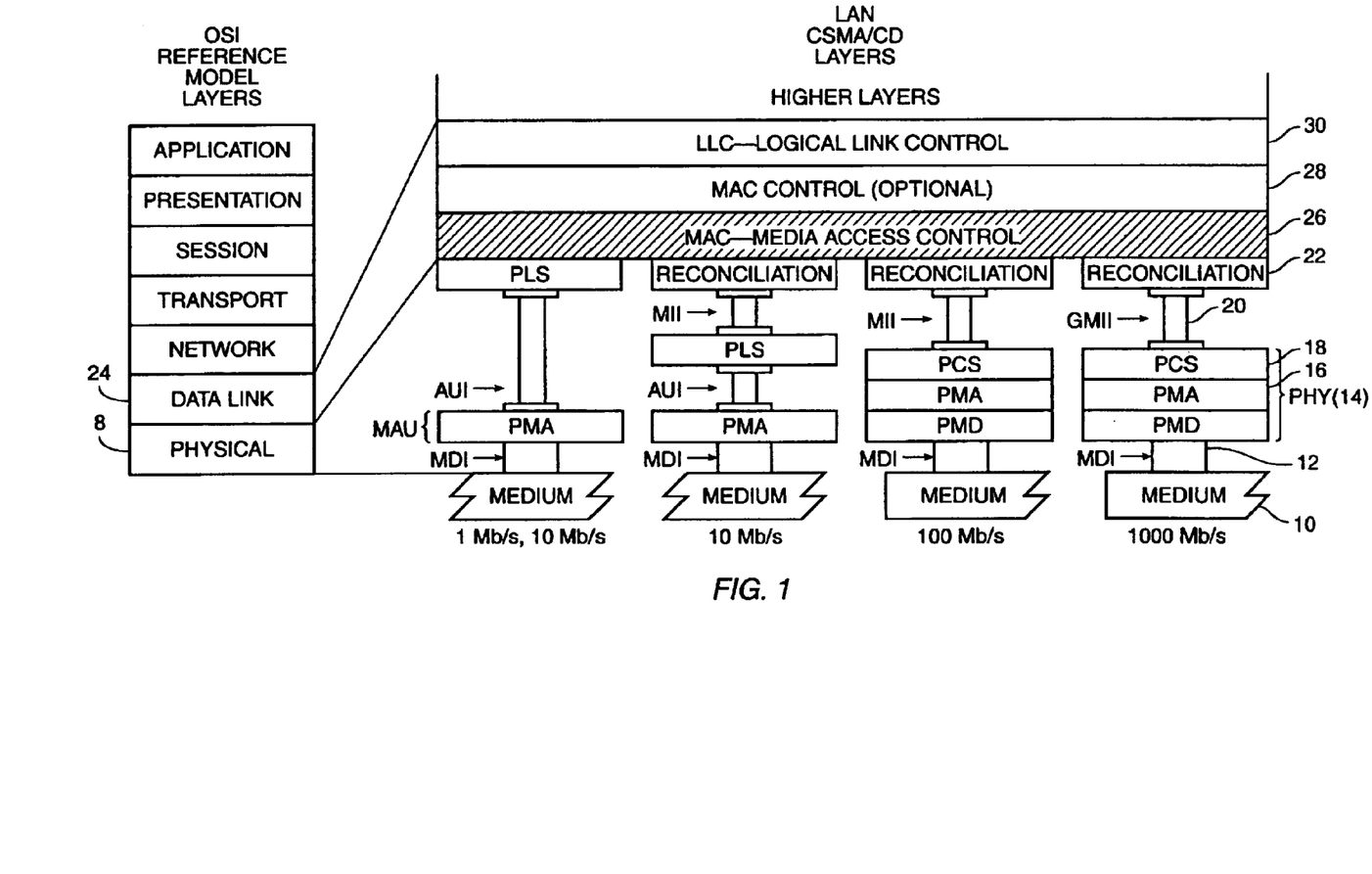
FIG. 1 is a block diagram showing the relationships of the various components of the Physical Layer and Data Link Layer in accordance with the ISO/IEC 8802-3 Open Systems Interconnection (OSI) Reference Model and the IEEE 802.3 CSMA/CD LAN Model.

The IEEE 802.3 protocol defines the various aspects of a standard Ethernet LAN system. FIG. 1 is a diagram showing the relationships of the various components of the Physical Layer and Data Link Layer in accordance with the ISO/IEC 8802-3 Open Systems Interconnection (OSI) Reference Model and the IEEE 802.3 CSMA/CD LAN Model. The diagram shows four different implementations: the 1 Mb/s–10 Mb/s version at the left, the 10 Mb/s version, the 100 Mb/s version and the 1000 Mb/s (1 Gb/s) version at the right. In the diagram, from the bottom to the top, the Physical Layer 8 comprises the following: The "MEDIUM" 10 refers to the physical medium over which data is transmitted, i.e., twisted pairs of wires, fiber optic waveguide, coaxial cable, etc. The "MDI" 12 is a Medium Dependent Interface—an interface between the specific medium used (MEDIUM) 10 and the Physical Layer Device (PHY) 14. The PHY may include a Physical Medium Attachment (PMA) 16, a Physical Coding Sublayer (PCS) 18, and a Gigabit Media Independent Interface (GMII) 20 along with a Reconciliation function 22 which reconciles signals between the MAC 26 and the GMII 20.

At the Data Link Layer 24, above the Physical Layer 8, are the Media Access Control (MAC) 26 which controls access to the MEDIUM 10 as through a collision detection system, the optional MAC Control 28 which is responsible for sending and receiving MAC Control Frames for handling flow control; and the Logical Link Control (LLC) 30 which is a software layer controlling the hardware layers below it.

Figure 2:
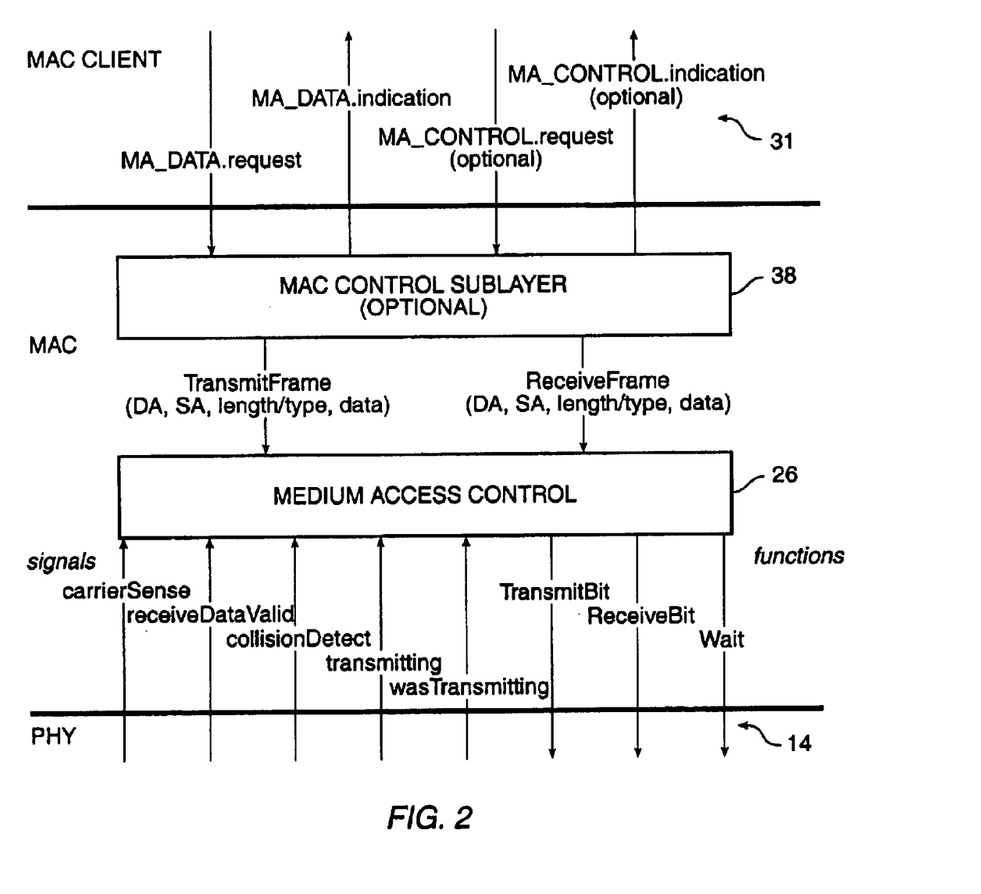
FIG. 2 is a schematic diagram showing the relationship and interface between the MAC Control Sublayer and the Medium Access Control, PHY and MAC Client.

According to this model, the layers interact by way of well defined interfaces, providing services as specified in the IEEE protocol. In general, the interface requirements are shown in FIG. 2 and are as follows:

(1) The interface between the MAC sublayer 26 and its client 31 includes facilities for transmitting and receiving frames, and provides per-operation status information for use by higher-layer error recovery procedures.

(2) The interface between the MAC sublayer 26 and the Physical layer 24 (FIG. 1) includes signals for framing (e.g., receive data valid, transmit indication) and contention resolution (e.g., collision detect), facilities for passing a pair of serial bit streams (i.e., transmit, receive) between the two layers.

Communication over an 802.3 LAN occurs between PHY 14 entities. Full-duplex operation allows simultaneous communication between a pair of stations using point-to-point media 10 (dedicated channel). Full-duplex operation does not require that transmitters defer, nor that they monitor or react to collisions, as there is no contention for a shared medium in this mode. Full-duplex is thus available when all of the following are true:

(1) The physical medium is capable of supporting simultaneous transmission and reception without interference;

(2) There are exactly two stations on the LAN. This allows the physical medium to be treated as a full-duplex point-to-point link between the stations. Since there is no contention for use of a shared medium, the multiple access (i.e., CSMA/CD) algorithms are unnecessary; and (3) Both stations on the LAN are capable of, and have been configured to use, full-duplex operation.

The most common configuration envisioned for full-duplex operation consists of a central bridge (also known as a switch) with a dedicated LAN connecting each bridge port to a single device.

Early Ethernet was based on a bus topology. In a bus topology all stations are connected to one data bus and all stations use the same data bus for transmitting data and receiving data. The first IEEE standardized "bus" media was actually a coaxial cable. This bus topology was well suited for the CSMA/CD protocol. Note that bus topologies (and CSMA/CD) only support half-duplex operation; that is, a station can only transmit data or it can receive data, but it cannot simultaneously transmit and receive data at the same time.

Later, users wanted to migrate away from relatively expensive coaxial cable as a media connection between stations and use common (and less expensive) telephone wire (also known as twisted pair cable) instead. The use of twisted pair cable for Ethernet networks was then standardized by the IEEE and is now commonly designated as "10BaseT". 10BaseT was different from its coaxial predecessor in that a 10BaseT network uses a "star topology". A star topology is a network configuration in which each station on the network is connected to a central repeater (also referred to as a "hub"), and there is a separate twisted pair cable for the transmit and receive directions between each station and the repeater. The repeater performed the CSMA/CD functions of repeating a signal from a station to all other stations on the network. This allowed seamless operation with the older bus topology, coaxial based Ethernet.

As time went on, Ethernet became widely deployed and 10BaseT became the medium of choice for networked computers. The success of 10BaseT caused a problem in that networks with lots of users became congested resulting in slow response. Since repeaters basically repeat a transmit packet from one station to all the rest of the stations on the network, a single active station could conceivably dominate the entire bandwidth of the network and other stations could experience significant delays in getting access to the network. To solve this problem, Ethernet switches were invented. Ethernet switches route packets from one station directly to those stations that are supposed to receive the packet. The other stations tied to the switch do not receive the packet and thus can still pass data through the network (unlike a repeater which ties up all stations while one station is transmitting). Hence, the rest of the users are free to access the rest of the network and are not impacted by a few high bandwidth users as much as they would be in repeater based LANs. Ethernet switches are directly analogous to telephone switches that route telephone calls from one point to another.

About the same time that Ethernet switches were invented, full-duplex Ethernet was invented. It was discovered that if 10BaseT had separate wire pairs for both receive and transmit directions, and if those wire pairs were connected directly to an Ethernet switch or similar device, then data could conceivably be transmitted and received at the same time because there were two distinct wire pairs (this is not true with coaxial Ethernet). This was commonly referred to as full-duplex operation. Full-duplex operation had the capability of doubling the maximum bandwidth on 10BaseT links because transmission and reception occurs simultaneously. Note that full-duplex operation requires that the collision mechanism be disabled because transmitting and receiving at the same time is defined to be a collision condition in the original Ethernet protocol.

Occasionally, an Ethernet switch could be temporarily filled to capacity or become bandwidth limited because of a high level of data activity on the individual ports. When this happens, packets could be dropped or discarded because of lack of internal switch bandwidth or memory. To prevent loss of data during times when the switch is overloaded or congested, flow control mechanisms are needed to give the switch the capability to regulate the flow of data into the switch.

The most common flow control technique used in Ethernet to stop data coming into the switch during times of maximum congestion is to forcibly create a collision on ports that are sending data to the switch. This forced collision will cause the far end station to stop transmitting data and retransmit data later in accordance with the Ethernet collision protocol. This is referred to as collision based flow control. Collision based flow control works well for half-duplex links, but it does not work at all for full-duplex links because the collision mechanism is disabled in full-duplex operation.

For full-duplex links new flow control mechanisms were invented. The early flow control mechanisms were proprietary to a particular vendor's equipment. Since these mechanisms were proprietary, the flow control mechanisms did not interoperate with equipment from other vendors. This fact rendered these proprietary flow control mechanisms useless in large networks composed of equipment obtained from a variety of different vendors.

In 1994, the IEEE formed the 802.3x Task Force with the charter of standardizing full-duplex operation and developing a standardized flow control mechanism. Many presentations were made at 802.3x meetings proposing a plethora of flow control schemes. Finally, the Task Force converged on one scheme and produced a final released draft standard that was formally adopted in 1997. The final draft standard is referred to as IEEE P802.3x/D3.2 and is entitled "Supplement to Carrier Sense Multiple Access with Collision Detection (CSMA/CD) Access Method & Physical Layer Specifications: Specification for 802.3 Full-Duplex Operation". This specification document is hereby incorporated herein by reference as if set forth fully herein. The 802.3x flow control mechanism is fairly simple. It implements a new kind of Ethernet packet called a MAC Control frame which is used by the MAC Control Layer 28 for implementing hardware flow control.

Figure 3:
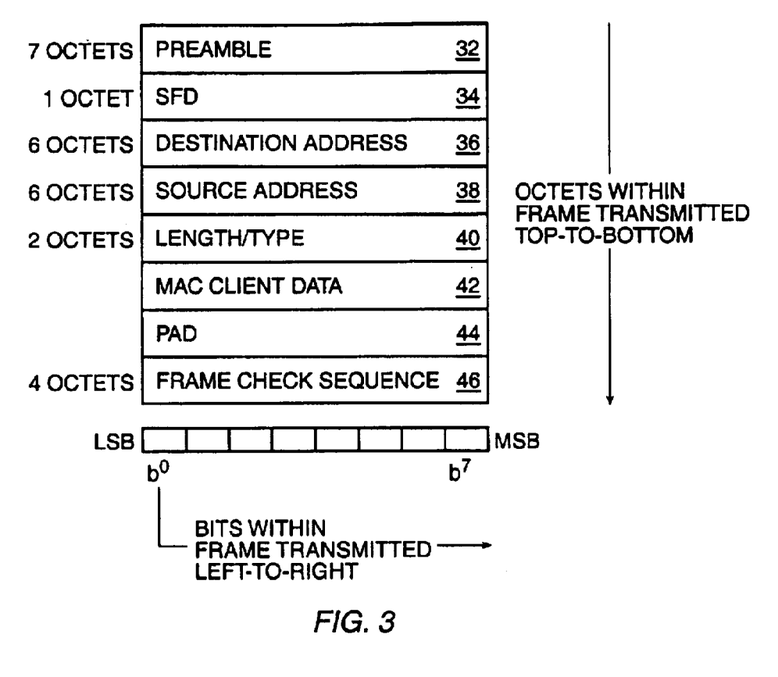
FIG. 3 is a diagram showing the MAC frame format.

The MAC frame format was originally defined in the IEEE 802.3 protocol and is updated in IEEE P802.3x at FIG. 3–1 and is reproduced here at FIG. 3. The MAC frame format consists of eight fields: the preamble 32, the Start-of-Frame Delimiter (SFD) 34, the addresses of the frame's destination ("destination address field" od "DA") 36 and source ("source address field" or "SA") 38, a Length/Type field (L/T) 40 to indicate the length or protocol type of the following field (DATA) 42 containing the MAC Client data to be transmitted, a PAD field 44 that contains padding if required, and the frame check sequence (FCS) field 46 containing a cyclic redundancy check value to detect errors in received frames. Of these eight fields, all are of fixed size except the DATA and PAD fields, which may contain any integer number of octets between the minimum and maximum values determined by the specific implementation of the CSMA/CD MAC.

The preamble field is a 7-octet field that is used to allow the Physical Layer Signalling (PLS) circuitry to reach its steady-state synchronization with the received frame timing. It consists of 56 bits of alternating 1's and 0's.

The SFD or Start of Frame delimiter is the 8-bit sequence "10101011" or $AB_{HEX}$. It immediately follows the preamble pattern and indicates the start of a frame.

MAC frame addresses are all 48 bits in length. The least significant bit (LSB) of the destination address field is an address type designation bit to identify the destination address either as an individual or a group address. If this bit is 0, it shall indicate that the address field contains an individual address. If this bit is 1, it shall indicate that the address field contains a group address that identifies none, one or more, or all of the stations connected to the LAN.

In the source address field, the first bit is reserved and is always set to 0. The next least significant bit is used to distinguish between locally or globally administered addresses. For globally administered (universal) addresses, the bit is set to 0. If an address is to be assigned locally, this bit is set to 1. For broadcast addresses, this bit is set to 1. A broadcast address denotes the set of all stations on a given LAN. A multicast-Group address denotes a group of logically related stations on a given LAN. A broadcast address is predefined as $FFFFFF_{HEX}$.

The Source Address field 38 is also a 48-bit address field containing the specific station address from which the frame originated. The format of the address field is as defined in IEEE 802.3.

The Length/Type Field 40 is a 16-bit field which takes on the meaning of packet length or packet type, depending on its numeric value. If the decimal value of the Length/Type field 40 is 0–1518, then it represents a length, i.e., the total number of bytes in the packet exclusive of the preamble 32 and the SFD 34. If the decimal value of the Length/Type field 40 is 1519–1535, then the meaning is undefined. If the decimal value of the Length/Type field 40 is greater than or equal to 1536, then it acts to specify a frame type.

The DATA field 42 is a 46–1500 byte field containing the actual data to be transmitted between two stations.

The PAD field 44 contains padding, if required, to bring the total packet length up to a certain value.

The frame check sequence (FCS) 46 is a 32-bit cyclic redundancy check (CRC) value computed on the entire frame, exclusive of preamble 32 and SFD 34. The FCS 46 is appended to the end of the frame and is used to determine frame validity.

A MAC Control frame is a specific implementation of a MAC frame. A MAC Control frame is diagrammed in FIG. 4. MAC Control frames 48 comprise MAC Client data for the CSMA/CD MAC. They are encapsulated by the CSMA/CD MAC shown in FIG. 3; that is, they are prepended by a Preamble 32 and Start-of-Frame delimiter 34 and appended by an FCS 46. MAC Control frames are distinguished from other MAC frames only by the contents of their Length/Type field 40, i.e., the Length/Type identifier. MAC Control frames 48 are thus identified by a unique code that is to be placed in the 2 byte Length/Type field 40. MAC Control frames 48 also have a 2 octet (or byte) MAC Control Opcode field 50 and an associated MAC Control Parameters field 52 as their MAC Client Data 42. The only opcode and Parameters Field defined to date under the 802.3x Specification is the Pause opcode and its associated 2 byte parameter field called the pause time parameter. In accordance with the protocol, unsupported MAC Control frames are to be discarded at the MAC Control sublayer. Only a single opcode may be associated with a particular MAC Control frame. When a station receives a MAC Control frame with the Pause opcode, it is required to stop transmissions for a time equal to the pause_time parameter. In this way, if a switch is congested and cannot temporarily accommodate any new data from end stations, the switch can instruct the end stations to stop transmitting data to the switch by sending MAC Control frames to the end stations.

As presently specified, opcode 00–00 is reserved, opcode 00–01 is the PAUSE opcode and opcodes 00–02 through FF—FF are reserved, i.e., unassigned to any function by the IEEE 802.3 specification.

Figure 4:
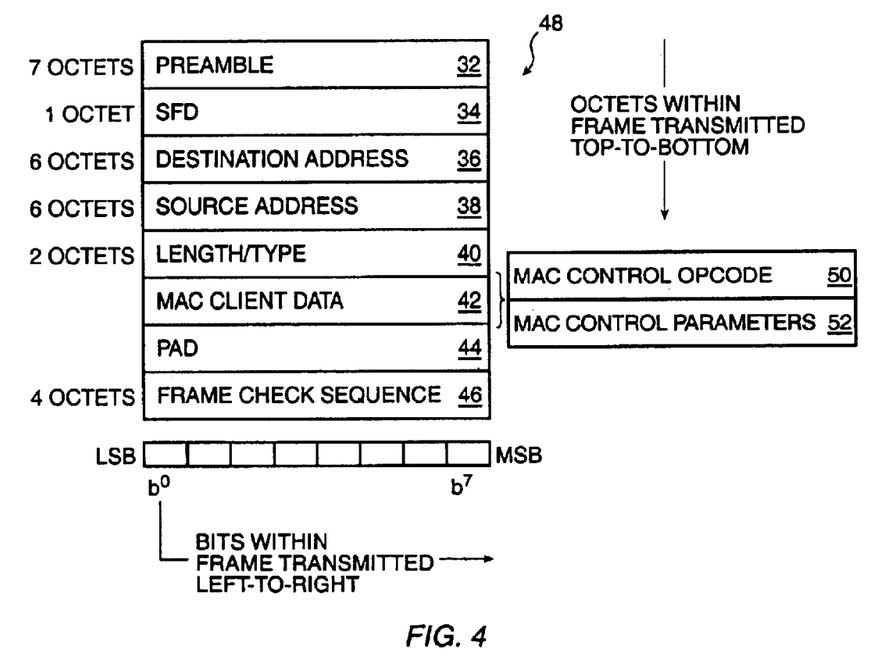
FIG. 4 is a diagram showing the MAC Control frame format.

The MAC Control frame has the same Preamble, SFD and FCS as a normal packet. The Destination Address for a frame with a Pause opcode (a "PAUSE frame") has to be either a specific unicast address on the network or the specific reserved multicast address of $0180\text{-}C200\text{-}0001_{HEX}$. The Source Address is the same as in a normal packet. The Length/Type field for MAC Control frames no longer indicates length, but instead indicates that the packet is a MAC Control frame. The Value in the Length/Type field for MAC Control frames is always set to $8808_{HEX}$. The MAC Control opcode includes two octets which consist of a flow control command, called a MAC Control opcode. Only one of these, PAUSE, is presently defined under IEEE 802.3x. MAC Control parameters are N octets of parameters associated with the flow control command. The PAD is similar to normal packets except that in a MAC Control frame, it must be filled with 0's.

The PAUSE opcode causes inhibition of normal packets for a specified amount of time defined by the value of the MAC Control parameter associated with it. PAUSE does not inhibit transmission of other MAC Control frames. PAUSE has a single parameter called pause_time. The pause_time parameter is a 2 byte number. It is in units of time called pause_time quanta. One pause_time quantum is equivalent to 512 bit times. A bit time is 100 ns for 10 Mb Ethernet, 10 ns for 100 Mb Ethernet, and 1 ns for Gigabit Ethernet. The pause_time parameter starts after the completion of the reception of the MAC Control frame that contained the PAUSE opcode. As pointed out above, the PAUSE opcode is only valid for MAC Control frames with the correct multicast Destination Address or the correct station unicast Destination Address.

Turning to FIG. 2, as contemplated in the IEEE 802.3x protocol, MAC Control frame generation occurs in the MAC Control Sublayer 28 in response to information received from the MAC Client layer 31 (typically the LLC 30 (FIG. 1)). For example, the MA_DATA.request primitive defines the transfer of data from a MAC client entity to a single peer entity or multiple peer entities in the case of group addresses. The MA_DATA.request primitive is formed of the parameters: destination_address, m_sdu and service_class. The destination address parameter may specify either an individual or a group MAC entity address. It must contain sufficient information to create the DA (destination address) field that is prepended to the frame by the local MAC sublayer entity and any physical information. The m_sdu parameter specifies the MAC service data unit to be transmitted by the MAC sublayer entity. There is sufficient information associated with m_sdu for the MAC sublayer entity to determine the length of the data unit. The service_class parameter indicates a quality of service requested by the MAC client which is only a single quality in the case of the CSMA/CD MAC protocol regardless of the request. The MA_DATA.request primitive is generated in accordance with IEEE 802.3x clause 2.3.1.3 by the MAC client entity whenever data shall be transferred to a peer entity or entities. This can be in response to a request from higher protocol layers or from data generated internally to the MAC client, such as required by Type 2 LLC service. Receipt of the primitive will cause the MAC entity to insert all MAC specific fields, including DA (destination address), SA (source address), and any fields that are unique to the particular media access method, and pass the properly formed frame to the lower protocol layers for transfer to the peer MAC sublayer entity or entities.

The MA_DATA.indication primitive defines the transfer of data from the MAC sublayer entity (through the optional MAC Control sublayer, if implemented) to the MAC client entity or entities in the case of group addresses. The primitive includes parameters: destination_address, source_address, m_sdu and reception_status. The destination_address parameter may be either an individual or a group address as specified by the DA field of the incoming frame. The source_address parameter is an individual address as specified by the SA field of the incoming frame. The m_sdu parameter specifies the MAC service data unit as received by the local MAC entity. The reception_status parameter is used to pass status information to the MAC client entity.

The MA_DATA.indication primitive is passed from the MAC sublayer entity (through the optional MAC Control sublayer, if implemented) to the MAC client entity or entities to indicate the arrival of a frame to the local MAC sublayer entity that is destined for the MAC Client. Such frames are reported only if they are validly formed, received without error, and their destination address designated the local MAC entity. Frames destined for the optional MAC Control sublayer are not passed to the MAC Client if the MAC Control sublayer is implemented. If the local MAC sublayer entity is designated by the destination_address parameter of an MA_DATA.request, the indication primitive will also be invoked by the MAC entity to the MAC client entity. This characteristic of the MAC sublayer may be due to unique functionality within the MAC sublayer or characteristics of the lower layers (for example, all frames transmitted to the broadcast address will invoke MA_DATA.indication at all stations in the network including the station that generated the request).

The MA_CONTROL.request primitive defines the transfer of control requests from the MAC client to the MAC Control Sublayer. Implementation of the MA_CONTROL.request primitive is mandatory if the optional MAC Control Sublayer is implemented in a device. The parameters of the primitive are: destination_address, opcode and request_operand_list. The destination_address parameter may specify either an individual or a group MAC entity address. It must contain sufficient information to create the DA field that is prepended to the frame by the local MAC sublayer entity. The opcode specifies the control operation requested by the MAC client entity. The request_operand_list is an opcode-specific set of parameters. This primitive is generated by a MAC Client (such as the LLC 31) whenever it wishes to use the services of the optional MAC Control sublayer entity. At present the only defined opcode is PAUSE.

The MA_CONTROL.indication primitive defines the transfer of control status indications from the MAC Control sublayer to the MAC client. Implementation of the MA_CONTROL.indication primitive is mandatory if the optional MAC Control sublayer is implemented in a device. The parameters for the primitive include: opcode and indication_operand_list.

The PAUSE operation is used to inhibit transmission of data frames for a specified period of time. A MAC Control client wishing to inhibit transmission of data frames from another station on the network generates a MA_CONTROL.request primitive specifying:

(1) The globally-assigned 48 bit multicast address 0180-C200-0001$_{HEX}$;
(2) The PAUSE opcode; and
(3) A request_operand indicating the length of time (in slot time units between 0 and 65535) for which it wishes to inhibit data frame transmission.

Note that the PAUSE operation will not inhibit transmission of MAC Control frames and that PAUSE frames will only be sent by stations configured for the full-duplex mode of operation. The specified multicast address has been reserved for use in MAC Control PAUSE frames for inhibiting transmission of data frames from a DTE in a full-duplex mode IEEE 802.3 LAN. IEEE 802.1 D-conformant bridges will not forward frames sent to this particular address. This approach allows individual LANs connected by bridges to be isolated and to operate independently without undue spread of PAUSE frames. It also relieves the MAC Control sublayer and its client from having to know, and maintain knowledge of the individual 48 bit addresses of other DTE in a full-duplex environment.

In full-duplex mode under IEEE 802.3x a station ignores any collision detect signal generated by the Physical Layer. Transmit Access Management in a full-duplex station will always be able to transmit its frames without contention, so there is never any need to process a collision detect signal and in accordance therewith retransmit later as with half-duplex Ethernet.

While this approach is successful in implementing full-duplex flow control in Ethernet network systems, a number of enhancements would be desirable to provide enhanced speed, throughput and interoperability over this basic flow control system while maintaining full compatibility with the IEEE standard.

SUMMARY OF THE INVENTION

In a first aspect of the present invention, pre-formatted MAC Control PAUSE frames are generated by a MAC device rather than by a switch. In a second aspect of the present invention, MAC Control PAUSE frames may be automatically generated and transmitted upon the occurrence of a threshold condition in the input buffer of the MAC device. In a third aspect of the present invention the MAC device, upon receipt of a Mac Control PAUSE frame, allows a packet in the process of being transmitted to complete transmission prior to implementing the PAUSE. In a fourth aspect of the present invention, the MAC device is capable of generating MAC Control frames having any desired opcode. In a fifth aspect of the present invention the parameter field associated with the MAC Control frame opcode is programmable, allowing selective pausing of the remote station and flexible use with non-PAUSE opcodes. In a sixth aspect of the present invention, the destination address of the MAC Control frame is programmable and may be set to any desired value. In a seventh aspect of the present invention, automatic x-on/x-off is implemented by, upon the occurrence of a flow control assertion, sending an automatically generated MAC Control frame to PAUSE a remote device for a selected amount of time, simultaneously the MAC counts down for the selected amount of time and, if flow control is still asserted, another PAUSE frame is sent before the expiration of the prior PAUSE frame results in the remote device going active. Optionally, a PAUSE frame with a selected amount of time set to zero may be sent to terminate the PAUSE at the remote device. In an eighth aspect of the present invention, flags may be set to enable/disable the IEEE 802.3x pause function in the MAC device. In a ninth aspect of the present invention, flags may be set which override basic IEEE 802.3x operation to (1) allow MAC Control frames to pass/not pass through the MAC; (2) allow MAC Control frames with PAUSE opcodes to pass/not pass through the MAC; and (3) allow MAC Control frames with non-PAUSE opcodes to pass/not pass through the MAC. In a tenth aspect of the present invention, flags may be set which override basic IEEE 802.3x operation to (1) allow MAC Control frames to be acted on independent of destination address and (2) allow MAC Control frames to be acted on which are addressed to destination addresses other than the reserved multicast address.

OBJECTS AND ADVANTAGES OF THE INVENTION

Accordingly, it is an object and advantage of the present invention to provide for automatic generation of MAC Control frames within a device existing within the MAC sublayer of an Ethernet LAN.

It is a further object and advantage of the present invention to reduce delays in transmitting MAC Control frames.

It is a further object and advantage of the present invention to provide for automatic MAC Control frame generation when a receive buffer within a device existing within the MAC sublayer of an Ethernet LAN exceed a predetermined threshold of activity or fullness.

Yet a further object and advantage of the present invention to provide mechanisms for increasing the speed, bandwidth and performance of Ethernet LAN systems implementing IEEE 802.3x full-duplex protocols.

These and many other objects and advantages of the present invention will become apparent to those of ordinary skill in the art from a consideration of the drawings and ensuing description of the invention.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

The above 802.3x flow control has been implemented in, for example, the SEEQ 8100 Gigabit Ethernet MAC & PCS Ethernet controller product available from SEEQ Technology Incorporated of Fremont, Calif., which implements the MAC and PCS sublayers of the IEEE 802.3 Ethernet protocol substantially in accordance with the IEEE 802.3x standard described above. The preliminary datasheet dated May 30, 1997 for the SEEQ 8100 is hereby incorporated herein by reference as if set forth fully herein.

In implementing the 802.3x full-duplex protocol, the following advanced features have also been discovered and implemented which provide additional functionality and capability well beyond the basic IEEE 802.3x protocol while maintaining compatibility with it.

Pre-Formatted MAC Control Frames

In accordance with this invention, pre-formatted MAC Control PAUSE frames are generated by a MAC device rather than by a switch. In order to make the 802.3x flow control mechanism more useful to switch designers, a feature has been added which is called automatic MAC Control frame generation. This feature utilizes a flow control signal (called "FCNTRL" in the example below) that will automatically cause the generation and transmission of a MAC Control frame within the MAC rather than at a higher level. The MAC Control frame data is, in effect, prestored inside the MAC, and it is automatically transmitted when the flow control signal is asserted. Automatic MAC Control frame generation in the MAC eliminates the complexity and delay in generating MAC control frames inside a switch or bridge. The memory full or system congested signal from inside a switch or bridge can be tied to a flow control signal input pin on a MAC device and thus the flow control mechanism is automatically taken care of—when the switch decides that it is too full, it asserts the flow control signal directly, that signal is then asserted within the MAC device and the MAC device automatically generates and sends an appropriate MAC Control frame.

Figure 5A:
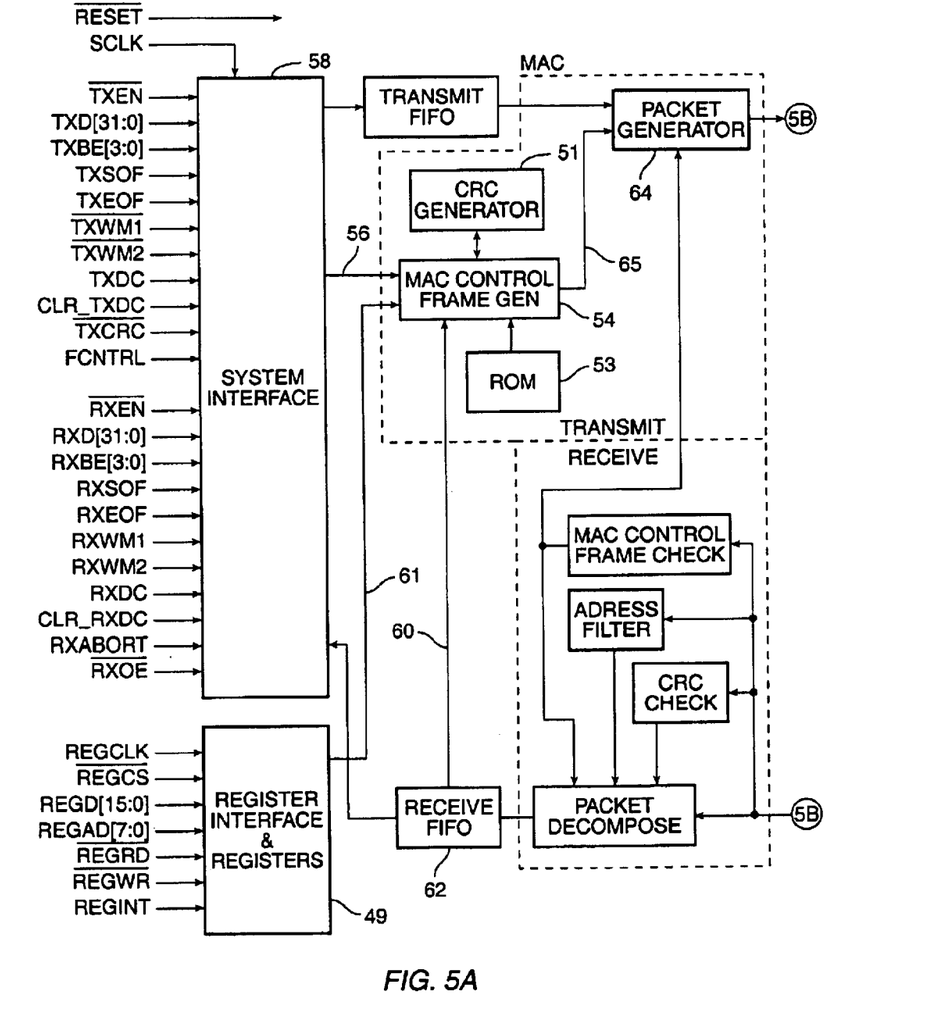
FIG. 5 is a system block diagram showing a MAC control device in accordance with a presently preferred embodiment of the present invention.
Figure 5B:
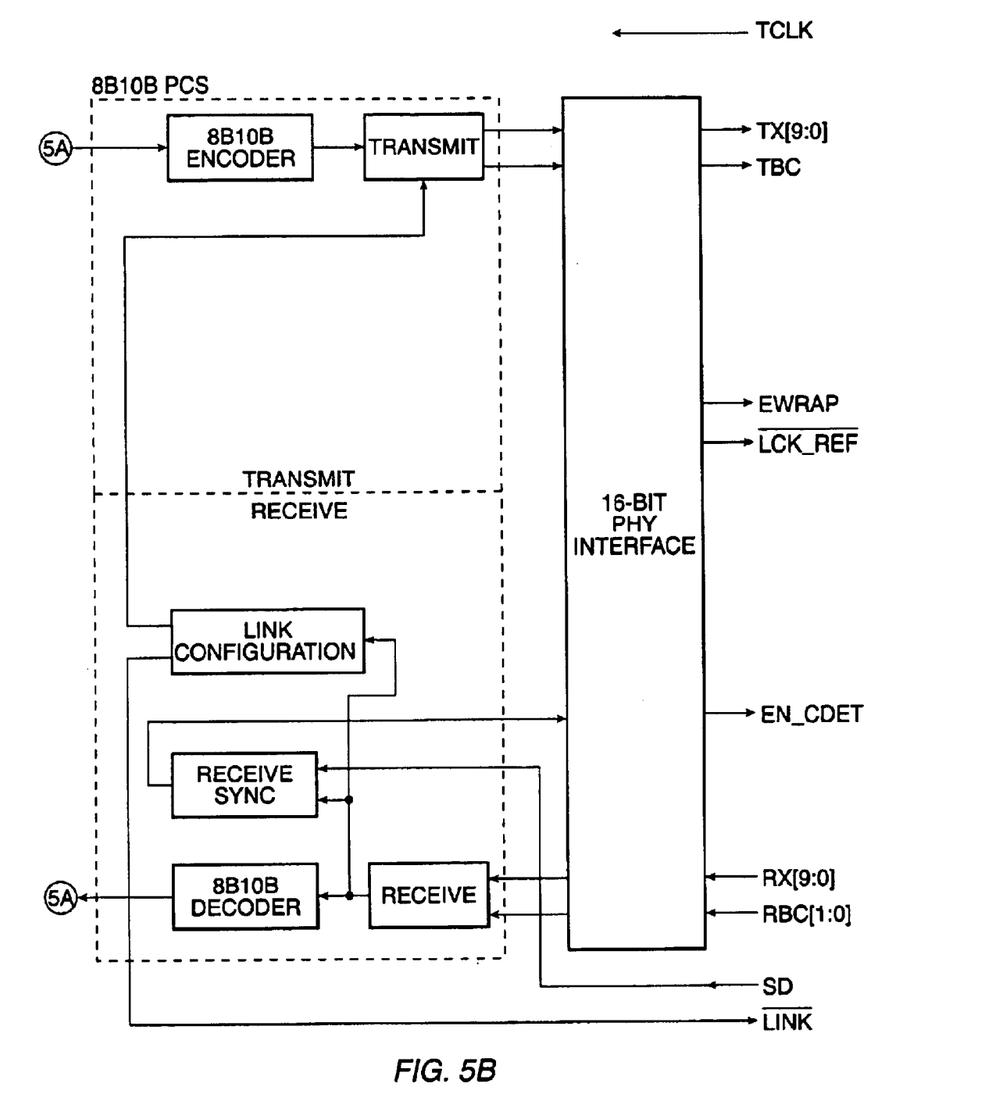

Turning to FIG. 5, a system block diagram of the SEEQ 8100 is shown. MAC Control frame generation occurs at block 54 in response to a signal received on line 56 from the System Interface 58 or in response to a signal received on line 60 from the receive first in first out (FIFO) buffer 62. The MAC Control Frame Generator block 54 then transmits information to the Packet Generator block 64 which initiates the process of sending the packet over the PCS of the PHY and then onto the MEDIUM.

Implementation of Automatically Generated Pause Frames

In accordance with a presently preferred embodiment of the present invention, an automatically generated MAC Control Frame, such as a PAUSE frame used by the SEEQ 8100 is described in TABLE I:

TABLE I

| Field | Value | How Generated/Where Stored |
|---|---|---|
| Preamble | Normal | Hardwired Logic |
| SFD | Normal | Hardwired Logic |
| Destination Address | 802.3x specified reserved multi-cast address | Hardwired Logic |
| Source Address | Externally supplied by writing it to a register | Stored in register MAC ADDRESS 1 - 3 |
| Length/Type Field | 802.3x specified | Hardwired Logic |
| Opcode | 802.3x specified PAUSE opcode | Hardwired Logic |
| Parameter Field | Externally supplied by writing it to a register -- defines how long to pause in a PAUSE frame | Stored in register FLOW CONTROL 2 |
| Pad Field | Normal | Hardwired Logic |
| FCS | Normal | Computed by the CRC GENERATOR based on above (contents of FCS field are exclusive of preamble and SFD) |

In TABLE I, the references to "hardwired logic" simply mean that the requisite information is stored in the MAC device or in associated memory in a relatively permanent fashion. This could be in any time of Read Only Memory (ROM) 53 known to those of ordinary skill in the art and specifically including, but not limited to ROM, PROM, EPROM, EEPROM, Flash EEPROM and the like.

As pointed out above and shown in detail in FIG. 4, the Preamble 32, SFD 34, DA 36, L/T 40, Opcode 50, PAD 44 are all pre-defined and can be permanently stored. There are three values which cannot be permanently stored, however. These are the Source Address 38, the MAC Parameter Field 52, and the FCS 46. The Source Address 38 is stored in a three register block (16 bits each) known as MAC ADDRESS REGISTERS 1–3 in the register array 49 (FIG. 5). The Parameter Field 52 is stored in a register known "FLOW CONTROL 2" in register array 49 (FIG. 5). Parameter Field 52 specifies how long to pause for. Finally, the FCS 46, because it depends upon the fixed and variable values previously described, must be calculated before each MAC Control Frame goes out.

Turning now to FIG. 5, calculation of the FCS value is performed by the CRC Generator 51 on the fly. The fixed values are acquired by MAC Control Frame Generator 54 from ROM 53. As each value is acquired, MAC Control Frame Generator 54 communicates with CRC Generator 51 so that CRC Generator 51 may compute the CRC value which will become the FCS value. The values of the Register-stored items are transmitted to the MAC Control Frame Generator over line 61 from the register array 49, and as this is performed, the CRC Generator 51 also received the values from the MAC Control Frame Generator 54 so that CRC Generator 51 may continue to calculate the FCS value. Finally, when all of the information save for the FCS value has been assembled by the MAC Control Frame Generator 54 and shared with the CRC Generator 51, the CRC Generator 51 passes the completed FCS value to the MAC Control Frame Generator 54. This information is transmitted to packet generator 64 which, having received a complete MAC Control Frame from the MAC Control Frame Generator 54 over line 65, is now able to initiate the transmission of a MAC Control Frame to the network in the conventional manner.

Automatic MAC control Frame Generation on Buffer Condition

In accordance with this aspect of the invention, MAC Control PAUSE frames may be automatically generated and transmitted upon the occurrence of a threshold condition such as full or near full detected at the input buffer of the MAC. By monitoring the receive FIFO buffer 62 for a condition of being too full or exceeding a specified level of fullness, upon detection of that condition, a signal on line 60 can be asserted to initiate automatic generation of a MAC Control frame (e.g., a PAUSE frame) at block 54. Preferably, the point at which automatic generation is triggered, called the MAC control autosend threshold, is programmable over the entire range of the FIFO with some register bits (or, alternatively, by pins) that can be externally programmed.

Completion of Packet Transmission Prior to PAUSE Implementation

In accordance with this aspect of the invention, the MAC device, upon receipt of a Mac Control PAUSE frame, allows a packet in the process of being transmitted to complete transmission prior to implementing the PAUSE. This is called the Transmit Queuing Mechanism. If there is a series of packets already queued up for transmission when the flow control signal is asserted (i.e., the signal on lines 56 or 60), then the MAC device waits until the current packet being transmitted is completed, and then transmits the MAC Control frame in front of any other packets that might be in the transmit queue. This allows the MAC Control frame to be transmitted at the earliest possible time without corrupting or interrupting any normal packets.

Non-Standard Opcode MAC Control Frames

In accordance with this aspect of the present invention, the MAC device is capable of generating MAC Control frames having any desired opcode as programmed. Currently, the only opcode defined by IEEE 802.3x is the PAUSE opcode. In accordance with the present invention, the chip defaults to the PAUSE opcode, but this value can be overridden by the user. The advantage of this is that the user can use MAC Control frames to send non IEEE defined opcodes, proprietary messages, or other data to stations in the network. Since non-proprietary stations will recognize a MAC Control frame but not understand the proprietary opcode, the non-proprietary stations will discard these proprietary MAC Control frames as invalid in accordance with IEEE 802.3x and system performance will not be affected. Also, the programmability of the opcode allows future IEEE authorized opcodes to be implemented in software, without a need to replace the hardware MAC device to achieve the added functionality.

Programmable Opcode Parameter Field

In accordance with this aspect of the present invention the parameter field associated with the MAC Control frame opcode is programmable, allowing selective length of time pausing of the remote station and flexible use with non-PAUSE opcodes. Currently, the only parameter field defined by IEEE 802.3x is for the PAUSE opcode, and that parameter field is called the pause_time. Pause_time is the amount of time that a station should pause its transmitter if it receives a PAUSE MAC Control frame. Preferably the chip defaults to the maximum value for the pause_ parameter, but this value can be overridden by the user. The advantage of this is that the user can control the amount of time that the far end station should be paused in advance of the actual command to pause. Also, if proprietary opcodes are used, the programmability of this field allows user control on whatever function this parameter field designates.

Programmable Destination Address

In accordance with this aspect of the present invention, the source and destination address of the MAC Control frame are programmable and may be set to any desired value. These are preferably programmable through a register interface to the MAC device. Currently, the receive destination address for the PAUSE opcode is defined by 802.3x to be a fixed address called the reserved multicast address as discussed above or the individual station unicast address of the particular destination station. Preferably the chip defaults the destination address of the MAC Control frame to the value for the reserved multicast address, but this value can be overridden by the user. The advantage of this is that the user can send PAUSE MAC Control frames to specific stations by controlling the destination address value, something the IEEE 802.3x protocol does not allow. This feature also allows proprietary MAC Control frames to be sent to specific stations as desired.

Automatic X-on/X-off

A congested switch needs to decide how long to pause a far end station when it sends a PAUSE MAC Control frame. It does this with the pause_time parameter in the MAC Control frame. If the value for pause_time is too long, then the bandwidth of the system is reduced unnecessarily since the far end station has to wait until the pause_time interval is over before it can send a packet to the switch, even though the switch may have cleared itself of congestion and have available bandwidth and memory for more data. If the value for pause_time is too short, then the user needs to send another PAUSE command. Sending an excessive number of MAC Control frames reduces available bandwidth and consumes switch resources. Thus sending more MAC Control frames than necessary reduces switch performance. To optimize switch and network performance, it is desirable to send a value for pause_time that accurately reflects when the switch will be uncongested. Obviously, this exact value may not be known in advance. X-off/x-on helps to pause a far end station for the exact amount of time needed, thus reducing any of the previous mentioned inefficiency.

This feature works as follows: when the flow control signal is asserted (as on line 56 or 60), then a MAC Control frame is automatically generated. At the moment an automatically generated MAC Control frame is transmitted, a count-down timer internal to the MAC and set equal to the pause_time in the transmitted frame programmed in by the user is started. When this internal timer expires, another MAC Control frame is sent, provided that the flow control signal is still asserted. This process repeats until the flow control signal is deasserted. When the flow control signal is deasserted, then, optionally, one last MAC Control frame with the pause_time value equal to 0 may be sent so as to immediately turn on the far end transmitter. Note that this final pause_time=0 MAC Control frame may not be necessary because the user could just let the last sent non-zero MAC Control pause frame time out. Preferably, then, this feature is programmable so that it may be turned on or off.

In accordance with this aspect of the present invention, upon the occurrence of a flow control assertion as on lines 56 or 60, automatic x-on/x-off is implemented by sending an automatically generated MAC Control frame to PAUSE a remote device for a selected amount of time, while simultaneously the MAC counts down for the selected amount of time and, if flow control is still asserted at the end of the countdown, another PAUSE frame is sent before the expiration of the prior PAUSE frame results in the remote device going active. Optionally, a PAUSE frame with pause_time set to zero may be sent to terminate the PAUSE at the remote device.

A MAC Control frame transmission has a number of possible delays before it can pause a far end station. These include: (1) a PAUSE frame potentially has to wait for at least one packet before it can be transmitted; (2) the network length imposes delays; (3) electrical delays inside the MAC itself impose delays. Thus, the minimum pause_time specified for the PAUSE command must be longer than the maximum packet size plus any latency or delays. This is preferably achieved by subtracting a fixed value (preferably 32 in the preferred embodiment but other values would work as well) to any pause_time parameter programmed into the device. In this way, system performance is enhanced because time is not wasted due to corrupting the packet under transmission when the flow control signal was asserted.

PAUSE Enable/Disable

In accordance with this aspect of the present invention, flags may be set to enable/disable the IEEE 802.3x pause function in the MAC device. Preferably some register bits are included which selectively enable or disable the transmitter PAUSE function if the device receives a PAUSE frame. This gives the user the option to allow the 802.3x PAUSE function to be implemented in the MAC device, or it may be done by some other means.

Selective MAC Control Frame Pass

The IEEE 802.3x protocol defines that MAC Control frames are not passed through the MAC. In accordance with this aspect of the present invention, flags (preferably externally programmable register bits) may be set which override basic IEEE 802.3x operation to (1) allow MAC Control frames to pass/not pass through the MAC; (2) allow MAC Control frames with PAUSE opcodes to pass/not pass through the MAC; and (3) allow MAC Control frames with non-PAUSE opcodes to pass/not pass through the MAC. These bits allow flexibility in implementing proprietary functions with MAC Control frames, allow the ability to process the MAC Control frames in some other section of the system than the MAC, and allow proprietary MAC Control frames to be passed through the MAC to the switch for processing.

Selective MAC Control Frame Implementation

In the 802.3x standard, PAUSE frames are the only ones currently defined and to be received (i.e., passed to the logical link control layer) they must have either the reserved multicast address or the individual station unicast address in the destination address position; if they don't have the reserved multicast address, they are supposed to be ignored. In accordance with this aspect of the present invention, flags (preferably externally programmable register bits) may be set which override basic IEEE 802.3x operation to (1) allow MAC Control frames to be acted on independent of destination address and (2) allow MAC Control frames to be acted on which are addressed to destination addresses other than the reserved multicast address. By allowing the MAC device to respond to destination addresses other than the reserved multicast, users can send PAUSE frames or proprietary MAC Control frames to addresses other than the reserved multicast address.

Alternative Embodiments

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. A method for operating a media access control device comprising:

detecting the assertion of a flow control condition;

generating a PAUSE frame in response to the detection of a flow control condition, said PAUSE frame directing a remote device to PAUSE for a first amount of time;

causing the media access device to wait for a second amount of time, said second amount of time being less than or equal to said first amount of time; and generating, upon expiration of said second amount of time and the continued assertion of said flow control condition, an additional PAUSE frame directing a remote device to PAUSE for a first amount of time.

2. A method according to claim 1, further comprising:

generating, upon expiration of said second amount of time and the non-persistence of said flow control condition, an additional PAUSE frame having a pause_time value of zero.

* * * * *